United States Patent [19]
Takagi

[11] Patent Number: 5,937,379
[45] Date of Patent: Aug. 10, 1999

[54] CANCELER OF SPEECH AND NOISE, AND SPEECH RECOGNITION APPARATUS

[75] Inventor: Keizaburo Takagi, Tokyo, Japan

[73] Assignee: NEC Corporation, Tokyo, Japan

[21] Appl. No.: 08/819,036

[22] Filed: Mar. 17, 1997

[30] Foreign Application Priority Data

Mar. 15, 1996 [JP] Japan .................................. 8-058633

[51] Int. Cl.[6] ...................................................... G01L 7/08
[52] U.S. Cl. ........................................ 704/233; 379/411
[58] Field of Search ................................. 704/226, 227, 704/228, 233, 214, 200; 379/411; 370/286

[56] References Cited

U.S. PATENT DOCUMENTS

| | | | |
|---|---|---|---|
| 4,897,878 | 1/1990 | Boll et al. | 704/233 |
| 4,914,692 | 4/1990 | Hartwell et al. | 379/410 |
| 5,125,024 | 6/1992 | Gokeen et al. | 379/88.01 |
| 5,155,760 | 10/1992 | Johnson et al. | 379/88.01 |
| 5,329,472 | 7/1994 | Sugiyama | 364/724.19 |
| 5,475,791 | 12/1995 | Schalk et al. | 704/233 |
| 5,502,747 | 3/1996 | McGrath | 375/350 |
| 5,533,133 | 7/1996 | Lamkin et al. | 381/94.5 |
| 5,535,149 | 7/1996 | Mori et al. | 364/724.19 |
| 5,680,393 | 10/1997 | Bourmeyster et al. | 370/286 |
| 5,761,638 | 6/1998 | Knittle et al. | 704/233 |
| 5,787,165 | 7/1998 | Lilja et al. | 379/390 |
| 5,808,913 | 9/1998 | Choi et al. | 379/406 |
| 5,809,463 | 9/1998 | Gupta et al. | 704/233 |
| 5,864,804 | 1/1999 | Kalveram | 704/233 |

FOREIGN PATENT DOCUMENTS 0 695 045   1/1996   European Pat. Off. .

OTHER PUBLICATIONS

S.F. Boll, "Suppression of Acoustic Noise in Speech Using Spectral Subtraction", IEEE Transactions On Acoustics, Speech, And Signal Processing, pp. 113–120, vol. Asso 27, No. 2, Apr. 1979.

Y. Takebayashi et al., "Noisy Spontaneous Speech Understanding Using Noise Immunity Keyword Spotting With Adapstanding Using Noise Immunity Keyword Spotting With Adaptive Speech Response Cancellation", pp. 115–118, IEEE Speech Processing, vol. 2, Apr. 27, 1993.

By Ariyoshi et al., "Word Speech Recognition System with Dual Inputs Under Noise", *Acoustic Society of Japan*, (in Japanese) *Proceedings, Fall*, 1–8–5, pp. 9 and 10, Sep. 1990.

By Steven F. Boll, "Suppression of Acoustic Noise in Speech Using Spectral Subtraction", *IEEE Transactions on Acoustics, Speech, and Signal Processing*, vol. ASSP-27, No. 2, Apr. 1979, pp. 113–120.

Tsujii, "Echo Canceler Technology", *Nihon Kogyo Gijutsu Center*, Dec. 1986, p. 4, (in Japanese).

*Primary Examiner*—David R. Hudspeth
*Assistant Examiner*—Donald L. Storm
*Attorney, Agent, or Firm*—Young & Thompson

[57] ABSTRACT

A single-input spectral subtraction section 13 removes ambient noise around the caller from received signals. A characteristic correction section 14 estimates transmission characteristics from received and transmitted signals and corrects the transmitted signals to coincide with the received signals. And finally, a dual-input subtraction section 15 removes an automated voice by subtracting the output of the characteristic correction section 14 from the output of the single-input spectral subtraction section 13.

38 Claims, 5 Drawing Sheets

CANCELER OF SPEECH AND NOISE, AND SPEECH RECOGNITION APPARATUS

BACKGROUND OF THE INVENTION

1. Field of the Invention

The present invention relates to a speech canceler used for speech recognition on a telephone line, and, more particularly, to a technique for canceling both ambient noise introduced with a caller's voice and automated voice generated by the unit crossing over to the receiving side.

2. Description of the Related Art

When speech recognition is performed over a telephone line, it is often in the context of an interactive system, usually providing guidance consisting of an automated voice, which may be a computer-generated voice, a tape recording, or similar means. An example of such interaction is as follows:

<Guidance> This is XX Trading. Please state your inquiry?
<Caller> Inquiry on inventory.
<Guidance>Is it inquiry on inventory? Please answer with yes or no.
<Caller> Yes.

In this example of interaction, when the caller becomes familiar with the system to some extent, he or she may speak before completion of the guidance. Possibilities include a case in which the caller says "Inquiry on inventory" immediately after the first guidance of "This is XX Trading," or a case in which the caller says "Yes" immediately after the second guidance of "Is it inquiry on inventory?" Conventionally, in a speech recognition system, when the automated voice output by the system and the caller's voice overlap, input into the recognition system is both voices mixed by a two-four wire converter (hybrid). Since correct recognition cannot be attained when the two voices are overlapped, such conditions are unacceptable. Accordingly, even a user who is familiar to some extent should always wait until the automated voice completes an instruction, making the system very redundant and difficult-to-use, to the displeasure of users.

These speech recognition devices are designed to overcome such problems, and to enable them to recognize the user's voice uttered without awaiting completion of an automated voice prompt (so-called "barge-in") at high accuracy by extracting only the caller's voice when the automated voice and the caller's voice are overlapped. As an example, a speech canceler shown in "Echo Canceler Technology," edited by Tsujii, Nihon Kogyo Gijutsu Center, p. 4, December 1986 (hereinafter called "Reference 1") is described with reference to FIG. 13. The speech canceler shown in FIG. 13 is an example in which the technology of an echo canceler is applied to cancellation of a crossed-over signal in the hybrid within a repeating switch for a long distance telephone line, wherein speech at the transmission side is equalized with that at the reception side by using an adaptive filter on a time waveform, and subtraction is performed on the time waveform. Here, a description is given of an application of a speech recognition device in which the speech canceler described in Reference 1 is used for a telephone set at a subscriber. That is, when an automated voice is output, it crosses over the hybrid 131 to the receiver, which is the four-wire section. A pseudo echo generator section 133 corrects transmission characteristics of crossed-over speech so that residual echo is minimized, and generates a pseudo echo. A subtracter 132 subtracts the pseudo echo output from the pseudo echo generator section 133 from the crossed-over automated voice to cancel only the automated voice. In a state in which the caller's voice transmitted over the telephone line overlaps the automated voice, the pseudo echo generator section 133 generates the pseudo echo by utilizing the transmission characteristics most recently estimated, and the subtracter 132 cancels the echo relating only to the automated voice. The speech recognition section 134 performs speech recognition by using speech after the automated voice is removed.

Although the example shown in FIG. 13 indicates use of the adaptive filter on the time waveform, it may be implemented by subtraction of the power spectrum (so-called spectral subtraction of dual inputs). For example, when dual-input spectral subtraction shown in "Word Speech Recognition System with Dual inputs under Noise," Ariyoshi, Matsushita, and Fujimoto, Acoustic Society of Japan, Proceedings, Fall, 1-8-5. pp. 9–10, September 1990 (hereinafter called Reference 2) is used, a configuration similar to FIG. 13 may be implemented by an adaptive filter on a power spectrum and subtraction. Reference 2 shows a case where it is applied to perform speech recognition in a car. In this case, although ambient noise in the car is the subject of cancellation, in principle, it is same as speech cancellation technique of canceling the automated voice on the telephone line. This system can significantly reduce the amount of processing compared to the speech canceler described in Reference 1 because it performs the noise cancellation operation after removing phases on the power spectrum, so that a less expensive system can be configured.

However, the conventional speech canceler shown in Reference 1 only cancels the automated voice generated by the unit, and does not provide any measures against noise around the caller even when such noise has a high level, so that there arises a problem that the speech recognition performance is deteriorated.

Also, even if the speech canceler shown in Reference 2 is applied to the speech canceler on the telephone line, it only cancels the automated voice, so that there still remains the problem mentioned above.

When the noise level around the caller is high, therefore, it is impossible to correctly estimate the transmission characteristics on crossing-over to the receiver of the transmitted signal of a telephone set because of its effect, leading to deterioration of performance for canceling the automated voice.

The present invention is designed to solve the above problems, and is intended to provide a high performance speech and noise canceler canceling not only the automated voice generated by the unit but also noise around the caller, as well as a speech recognition device.

Another object is to cancel automated voice generated by the unit at high accuracy by canceling the influence of noise around the caller.

SUMMARY OF THE INVENTION

A first speech and noise canceler according to the present invention comprises:

a first subtraction section for determining ambient noise over an interval during which neither a caller nor an automated voice is speaking, and for removing said ambient noise from received signals;

a characteristic correction section for estimating transmission characteristics over an interval during which said automated voice is speaking and said ambient noise is not present, and for correcting transmitted signals by said transmission characteristics to coincide with said received signals; and a second subtraction section for removing said automated voice by subtracting the transmitted signals corrected by said characteristic correction section from the received signals from which said ambient noise has been removed by said first subtraction section.

A second speech and noise canceler according to the present invention further comprises:

a first DFT (discrete Fourier transform) section for converting received signals to first spectra;

a second DFT section for converting transmitted signals to second spectra;

a first subtraction section for determining ambient noise over an interval during which neither a caller nor an automated voice is speaking, and for removing said ambient noise from said first spectra;

a characteristic correction section for estimating transmission characteristics over an interval during which said automated voice is speaking and said ambient noise is not present, and for correcting said second spectra by said transmission characteristics to coincide with said first spectra; and a second subtraction section for removing said automated voice by subtracting the second spectra corrected by said characteristic correction section from the first spectra from which said ambient noise has been removed by said first subtraction section.

A third speech and noise canceler according to the present invention comprises:

a first subtraction section for determining ambient noise over an interval during which neither a caller nor an automated voice is speaking, and for removing said ambient noise from received signals;

a characteristic correction section for estimating transmission characteristics over an interval during which said automated voice is speaking, and for correcting transmitted signals by said transmission characteristics to coincide with the received signals from which said ambient noise has been removed by said first subtraction section; and a second subtraction section for removing said automated voice by subtracting the transmitted signals corrected by said characteristic correction section from the received signals from which said ambient noise has been removed by said first subtraction section.

A fourth speech and noise canceler according to the present invention comprises:

a first DFT section for converting received signals to first spectra;

a second DFT section for converting transmitted signals to second spectra;

a first subtraction section for determining ambient noise over an interval during which neither a caller nor an automated voice is speaking, and for removing said ambient noise from said first spectra;

a characteristic correction section for estimating transmission characteristics over an interval during which said automated voice is speaking, and for correcting said second spectra by said transmission characteristics to coincide with the first spectra from which said ambient noise has been removed by said first subtraction section; and a second subtraction section for removing said automated voice by subtracting the second spectra corrected by said characteristic correction section from the first spectra from which said ambient noise has been removed by said first subtraction section.

Also, in the speech and noise canceler according to the present invention, said characteristic correction section can detect an interval during which said automated voice is speaking by using signals indicating the presence of said automated voice.

Further, the speech and noise canceler according to the present invention can further comprise:

a speech detection section for detecting an interval during which the caller is speaking by using the first spectra from which said automated voice has been removed by said second subtraction section;

wherein said first subtraction section detects an interval during which the caller is not speaking based on detection by said speech detection section.

Also, in the speech and noise canceler according to the present invention, said first subtraction section can detect an interval during which said automated voice is not speaking by using signals indicating the presence of said automated voice.

Further, in the speech and noise canceler according to the present invention, said characteristic correction section detects an interval during which the caller is not speaking based on detection by said speech detection section.

Furthermore, the speech recognition device according to the present invention has a speech recognition section for recognizing speech by using the received signals or spectra from which said automated voice has been removed by said second subtraction section.

The present invention attains an advantage in that a high performance noise and speech canceler can be provided by extracting the caller's voice from signals in which the caller's voice on the telephone and a transmitted automated voice are overlapped, and canceling ambient noise around the caller, thereby providing excellent performance for canceling noise and speech which cannot be obtained from the conventional speech canceler.

DETAILED DESCRIPTION OF THE PREFERRED EMBODIMENTS

Embodiments of the present invention are described with reference to FIGS. 1 through 12.

Figure 1:
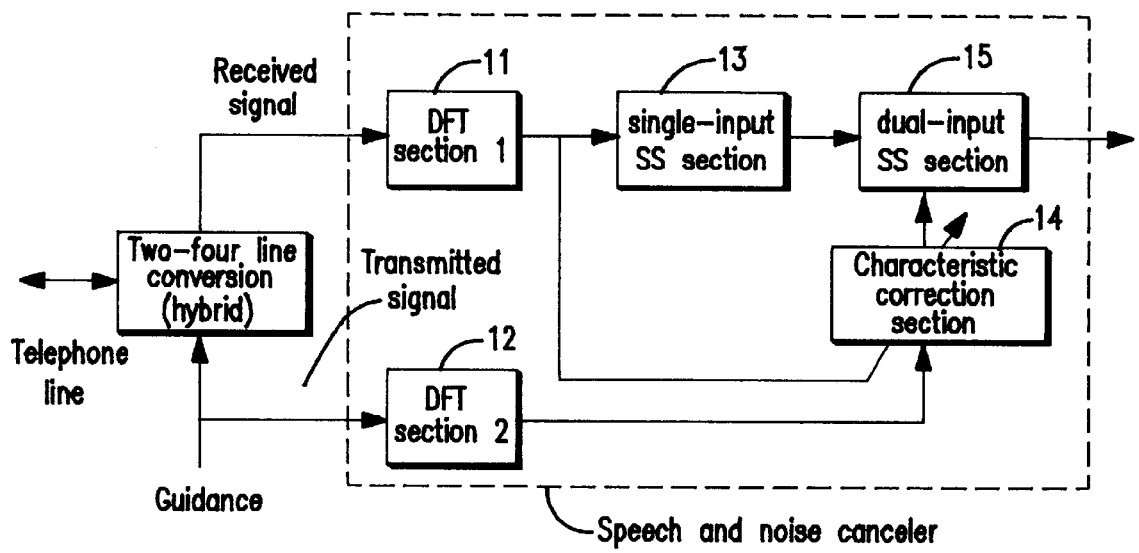
FIG. 1 is a block diagram showing an embodiment of a first speech and noise canceler according to the present invention.

FIG. 1 is a block diagram of a first speech and noise canceler of the present invention. This speech and noise canceler comprises a first DFT (discrete Fourier transform) section 11 for converting received telephone signals into spectra, a second DFT section 12 for converting transmitted telephone signals, such as automated voice, into spectra, a single-input spectral subtraction section 13 for removing ambient noise around the caller from the output of the first DFT section 11, a characteristic correction section 14 for estimating transmission characteristics on crossing-over of the transmitted signals to a receiver from the output of the first DFT section 11 and the output of the second DFT section 12, and correcting the output signals of the second DFT section 12 for the characteristics of the receiver, and a dual-input spectral subtraction section 15 for performing dual-input spectral subtraction by subtracting the output of the characteristic correction section 14 from the output of the single-input spectral subtraction section 13.

A signal in the form of an automated voice is delivered onto a telephone line through a hybrid, and also crosses over the hybrid to the receive line. When the caller speaks such that the caller's voice temporarily overlaps the automated voice, a signal in which both voices overlap is observed on the received signal line. If ambient noise is present in the caller's voice, the ambient noise around the caller is further overlapped on the received signal. Assuming that the caller's voice is s(t), the ambient noise is n(t), and the observed signal in which the ambient noise around the caller is overlapped is x(t), $$x(t)=s(t)+n(t) \tag{1}$$

Assuming that the automated voice signal to be delivered is y(t), and the impulse response characteristic of crossing-over at the hybrid is h(t), the signal w(t) observed on the signal line at the receiving side of the hybrid is expressed as follows:

$$w(t) = x(t) + h(t) \otimes y(t) \tag{2}$$

$$= s(t) + n(t) + h(t) \otimes y(t)$$

Here, ⊗ represents convolution between waveforms. Although, actually, a combined signal x(t) itself of the caller's voice and the ambient noise is transformed by the transfer characteristic of the hybrid, it is not taken into consideration here because it does not directly concern to the purpose of the present invention. The first DFT section 11 and the second DFT section 12 convert the transmitted and received signals of the hybrid into the power spectra, respectively. While an example performing DFT after conversion to a digital signal is used herein, other spectrum transformation or a filter bank may be employed. Assuming that the power spectrum of each output of the first and second DFT sections 11 and 12 is W(f) and V(f), the following relationships can be obtained:

$$W(f)=S(f)+N(f)+H(f)Y(f)V(f)=Y(f) \tag{3}$$

where S(f), N(f), H(f), and Y(f) represent the power spectrum of s(t), n(t), h(t), and y(t), respectively. Now, assuming that the ambient noise N(f) around the caller is constant, N(f) can be directly observed in an interval during which neither the caller's voice S(f) nor the automated voice Y(f) is present. For example, it can be observed at the moment when the line is connected to the caller and from a period during which the automated voice is not output. Then, the single-input spectral subtraction section 13 cancels the ambient noise around the caller by subtracting the ambient noise N'(f) thus found from the output spectrum from the first DFT section 11. Since various arrangements have been known in the art for the single-input spectral subtraction, detailed description is omitted herein. For example, S. F. Boll, "Suppression of Acoustic Noise in Speech Using Spectral Subtraction," IEEE Trans. on ASSP., Vol. ASSP-27, No. 2, pp. 113–120 (April 1979) (hereinafter called Reference 3) is an example. Assuming that the output spectrum of the single-input spectral subtraction section 13 is $W_1(f)$, the ambient noise around the caller is canceled as:

$$W_1(f) = W(f) - N'(f) \tag{4}$$

$$= S(f) + N(f) + H(f)Y(f) - N'(f)$$

$$\approx S(f) + H(f)Y(f)$$

Reference 3 describes a technique to zero out those components which become negative as the result of subtraction, or to set a lower limit and arrange those components not to take a value lower than such lower limit. It is a matter of course that such a technique may be provided, and that any other techniques utilizing single-input spectral subtraction may be employed. In addition, an average over a relatively long period of time may be used for the estimated noise N'(f). The characteristic correction section 14 first estimates the power transmission characteristic H(f) of the hybrid from the second DFT section 12 and the first DFT section 11. Now, if no caller's voice is present, but only the automated voice is present, the output of the first DFT section 11 is only the automated voice transformed by the hybrid as $$W(f) \approx H(f)Y(f) \ (N(f)=S(f)=0) \tag{5}$$

By using this period or an average over such interval, the transmission characteristic H'(f) can be previously estimated.

$$H'(f) = W(f)/V(f) \tag{6}$$

$$\approx H(f)Y(f)/Y(f) \ (N(f) = S(f) = 0)$$

$$= H(f)$$

The characteristic correction section 14 obtains an output V'(f) by multiplying the transmission characteristic H'(f) with the output of the second DFT section 12. The dual-input spectral subtraction section 15 outputs $W_2(f)$ by subtracting the output V'(f) of the characteristic correction section 14 from the output $W_1(f)$ of the single-input spectral subtraction section 13.

$$W_2(f) = W_1(f) - V'(f) \qquad (7)$$
$$= S(f) + H(f)Y(f) - H'(f)Y(f)$$
$$\approx S(f)$$

For the dual-input spectral subtraction, various approaches have also been known in the art. In addition to the approach described in Reference 2, any other approaches may be utilized as long as they apply the principle of dual-input spectral subtraction.

As described above, by providing the single-input spectral subtraction section 13 which cancels the ambient noise around the caller before performing the spectral subtraction for dual inputs, both the ambient noise and the automated voice are canceled from the spectrum $W_2(f)$ finally obtained even if the ambient noise around the caller is high, whereby a speech and noise canceler with high accuracy can be provided.

Figure 2:
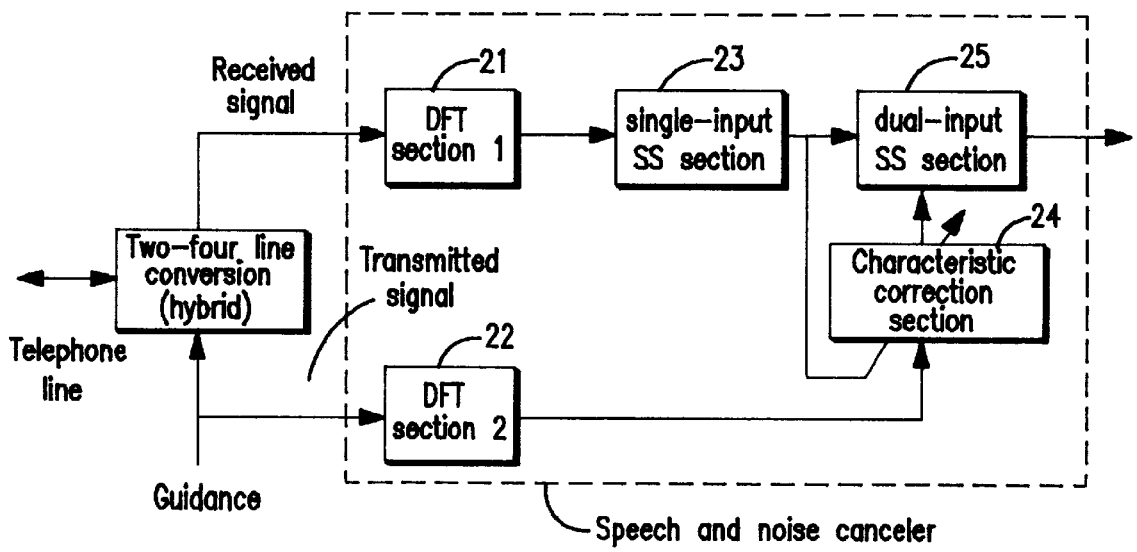
FIG. 2 is a block diagram showing an embodiment of a second speech and noise canceler according to the present invention.

FIG. 2 is a block diagram showing an embodiment of a second speech and noise canceler of the present invention. This speech and noise canceler comprises a first DFT section 21 for converting received telephone signals into spectra, a second DFT section 22 for converting transmitted telephone signals into spectra, a single-input spectral subtraction section 23 for removing ambient noise around the caller from the output of the first DFT section 21, a characteristic correction section 24 for estimating transmission characteristics on crossing-over of the transmitted signals to a receiver from the output of the single-input spectral subtraction section 23 and the output of the second DFT section 22, and correcting the output signals of the second DFT section 22 for the characteristics of the receiver, and a dual-input spectral subtraction section 25 for performing dual-input spectral subtraction by subtracting the output of the characteristic correction section 24 from the output of the single-input spectral subtraction section 23.

A signal in the form of an automated voice is delivered onto a telephone line through a hybrid, and also crosses over the hybrid to the receive line. When the caller speaks such that the caller's voice temporarily overlaps the automated voice, a signal in which both voices overlap is observed on the received signal line. If ambient noise is present in the caller's voice, the ambient noise around the caller is further overlapped on the received signal. Assuming that the caller's voice is s(t), the ambient noise is n(t), and the observed signal in which the ambient noise around the caller is overlapped is x(t), $$x(t) = s(t) + n(t) \qquad (8)$$

Assuming that the automated voice signal to be delivered is y(t), and the impulse response characteristic of crossing-over at the hybrid is h(t), the signal w(t) observed on the signal line at the receiving side of the hybrid is expressed as follows:

$$w(t) = x(t) + h(t) \otimes y(t) \qquad (9)$$
$$= s(t) + n(t) + h(t) \otimes y(t)$$

Here, ⊗ represents convolution between waveforms. Although, actually, a combined signal x(t) itself of the caller's voice and the ambient noise is transformed by the transfer characteristic of the hybrid, it is not taken into consideration here because it does not directly concern to the purpose of the present invention. The first DFT section 21 and the second DFT section 22 convert the transmitted and received signals of the hybrid into the power spectra, respectively. Assuming that the power spectrum of each output is W(f) and V(f), the following relationships can be obtained:

$$W(f) = S(f) + N(f) + H(f)Y(f)V(f) = Y(f) \qquad (10)$$

where S(f), N(f), H(f), and Y(f) represent the power spectrum of s(t), n(t), h(t), and y(t), respectively.

Now, assuming that the ambient noise N(f) around the caller is constant, N(f) can be directly observed in an interval during which neither the caller's voice S(f) nor the automated voice Y(f) is present. For example, it can be observed at the moment when the line is connected to the caller and from a period during which the automated voice is not output. In addition, it is naturally possible to observe it with the provision of speech detection means. The single-input spectral subtraction section 23 cancels the ambient noise around the caller by subtracting the ambient noise N'(f) thus found from the output spectrum from the first DFT section 21. Assuming that the output spectrum of the single-input spectral subtraction section 23 is $W_1(f)$, the ambient noise around the caller is canceled as:

$$W_1(f) = W(f) - N'(f) \qquad (11)$$
$$= S(f) + N(f) + H(f)Y(f) - N'(f)$$
$$\approx S(f) + H(f)Y(f)$$

The characteristic correction section 24 first estimates the power transmission characteristic H(f) of the hybrid from the second DFT section 22 and the single-input spectral subtraction section 23. Now, if no caller's voice is present, but only the automated voice is present, the output of the single-input spectral subtraction section 23 is only the automated voice transformed by the hybrid as $$W_1(f) \approx H(f)Y(f) \quad (S(f)=0) \qquad (12)$$

By using this period, the transmission characteristic H'(f) can be previously estimated.

$$H'(f) = W_1(f)/V(f) \qquad (13)$$
$$\approx H(f)Y(f)/Y(f) \quad (S(f) = 0)$$
$$= H(f)$$

The characteristic correction section 24 obtains an output V'(f) by multiplying the transmission characteristic H'(f) with the output of the second DFT section 22. The dual-input spectral subtraction section 25 outputs $W_2(f)$ by subtracting the output V'(f) of the characteristic correction section 24 from the output $W_1(f)$ of the single-input spectral subtraction section 23.

$$W_2(f) = W_1(f) - V'(f) \qquad (14)$$
$$= S(f) + H(f)Y(f) - H'(f)Y(f)$$
$$\approx S(f)$$

That is, the speech and noise canceler of FIG. 2 operates similarly to the speech and noise canceler of FIG. 1. It differs in that the characteristic correction section 24 of FIG. 2 estimates the transmission characteristics on crossing-over from the outputs of the second DFT section 22 and the single-input spectral subtraction section 23, rather than the output of the first DFT section 21. This is because the case of FIG. 2 assumes that only the caller's voice is not present, providing a longer interval candidate available for estimation of characteristics than the case of FIG. 1 assuming that ambient noise also is not present.

As described above, by providing the single-input spectral subtraction section 23 which cancels the ambient noise around the caller before performing the spectral subtraction for dual inputs, both the ambient noise and the automated voice are canceled from the spectrum $W_2(f)$ finally obtained even if the ambient noise around the caller is high, whereby a speech and noise canceler with high accuracy can be provided.

Of course, it would be easily derived from the above-mentioned method that, in a conventional speech canceler not provided with the single-input spectral subtraction section, the ambient noise around the caller and the automated voice which cannot be canceled are mixed in the spectrum output from a dual-input spectral subtraction section.

Figure 3:
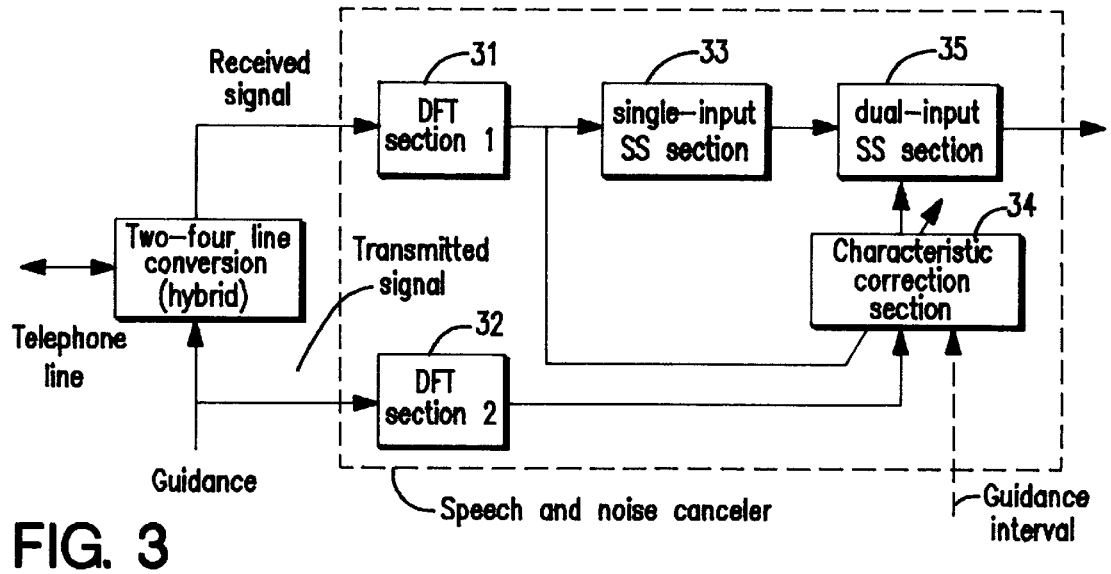
FIG. 3 is a block diagram showing an embodiment of a third speech and noise canceler according to the present invention.

FIG. 3 is a block diagram showing an embodiment of a third speech and noise canceler of the present invention. In this third speech and noise canceler, the characteristic correction section 34 in the first or second speech and noise canceler according to the present invention estimates transmission characteristics on crossing-over of the transmitted signals to a receiver of telephone by using an interval during which the transmitted signals are present, and corrects the output signals of a second DFT section 32 for the characteristics of the receiver. Here, FIG. 3 shows a case where it is implemented in the first speech and noise canceler of the present invention shown in FIG. 1.

Various methods are contemplated for identifying an interval during which transmitted signals of telephone are present. FIG. 3 only shows a case where a guidance interval signal is externally supplied, and it is utilized for identification. In addition, it may be possible to find the automated voice interval by directly using the output of the second DFT section 32, or using a guidance signal itself by utilizing simple power determination. Various methods have been known in the art for detecting an interval during which speech is present, and any method can be used. Since the automated voice is frequently started, completed, or interrupted during conversation with the caller, there exist intervals during which the automated voice is not present. In such case, there is a possibility that accuracy for estimating the transmission characteristic H'(f) is deteriorated when using signals from a period during which the ;automated voice is not present, or when finding the average of signals including those from a period during which the automated voice is not present. The third speech and noise canceler of the present invention shown in FIG. 3 is designed to solve such a problem.

Figure 4:
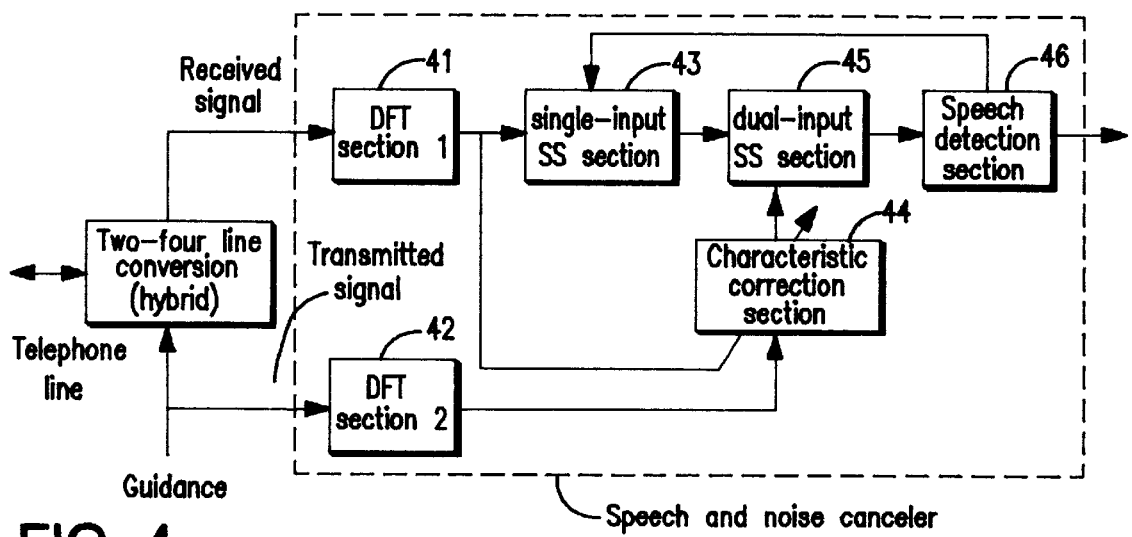
FIG. 4 is a block diagram showing an embodiment of a fourth speech and noise canceler according to the present invention.

FIG. 4 is a block diagram showing an embodiment of a fourth speech and noise canceler of the present invention. This speech and noise canceler comprises a speech detection section 46 for detecting an interval during which the caller is speaking by using the output of a dual-input spectral subtraction section 45 of the first or second speech and noise canceler, wherein a single-input spectral subtraction section 43 finds noise to be canceled over an interval during which the speech detection section 46 does not detect a speech interval. Here, FIG. 4 shows a case where it is implemented in the first speech and noise canceler of the present invention shown in FIG. 1.

A single-input spectral subtraction section 43 estimates the spectrum of ambient noise by using an interval during which only ambient noise around the caller is present. For example, although, as a simple method, the spectrum of ambient noise can be estimated by using a period immediately after a telephone line is connected, there may be a case where the noise canceling effect of the single-input spectral subtraction is deteriorated as speech mixes in the estimated spectrum as in a case where the caller immediately speaks. It is possible to provide a device which can stably operate even in such a case. The speech detection section 46 detects the start and end of the speech of the caller by using the spectrum information output from the dual-input spectral subtraction section 45. Various method have been known in the art for detecting an interval during which speech is present, and any method can be used. The speech detection section 46 may output only the spectrum finally found, and it may be possible to employ a configuration to output start and completion information of the detected speech, or to output only the spectrum from the start to completion of the detected speech.

Figure 5:
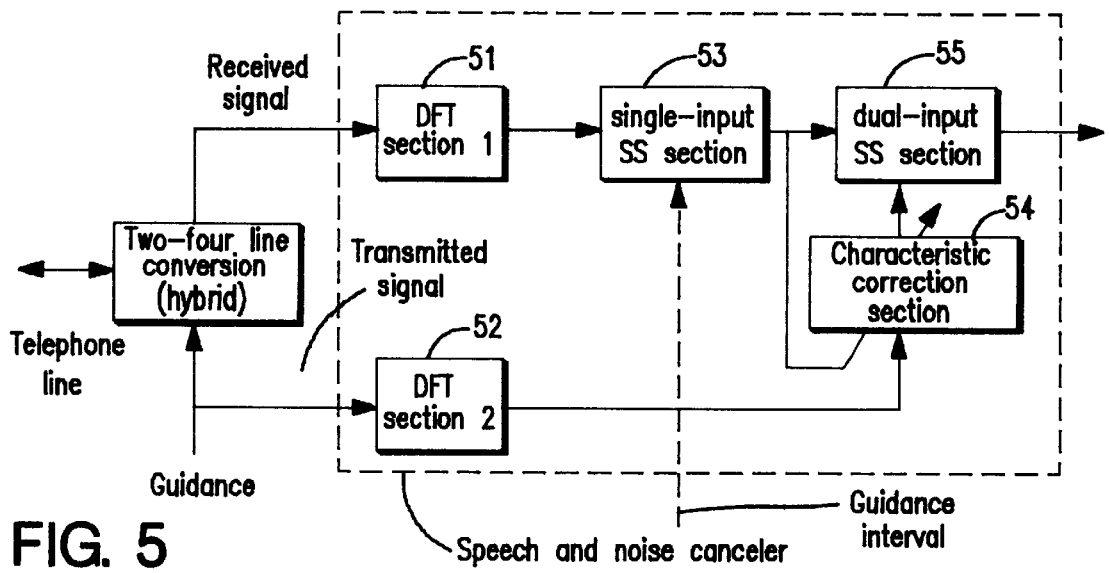
FIG. 5 is a block diagram showing an embodiment of a fifth speech and noise canceler according to the present invention.

FIG. 5 is a block diagram showing an embodiment of a fifth speech and noise canceler of the present invention. In this speech and noise canceler, in addition to the first or second speech and noise canceler, a single-input spectral subtraction section 53 finds noise to be canceled over an interval during which no transmitted telephone signal is present. Here, FIG. 5 shows a case where it is implemented in the first speech and noise canceler of the present invention shown in FIG. 1.

The single-input spectral subtraction section 53 estimates the spectrum of ambient noise by using an interval during which no automated voice is present. With such a configuration, it is possible to solve a possibility that accuracy for estimating the transmission characteristic H'(f) is deteriorated when using signals from a period during which the automated voice is not present, or when finding the average of signals including those from a period during which the automated voice is not present.

Figure 6:
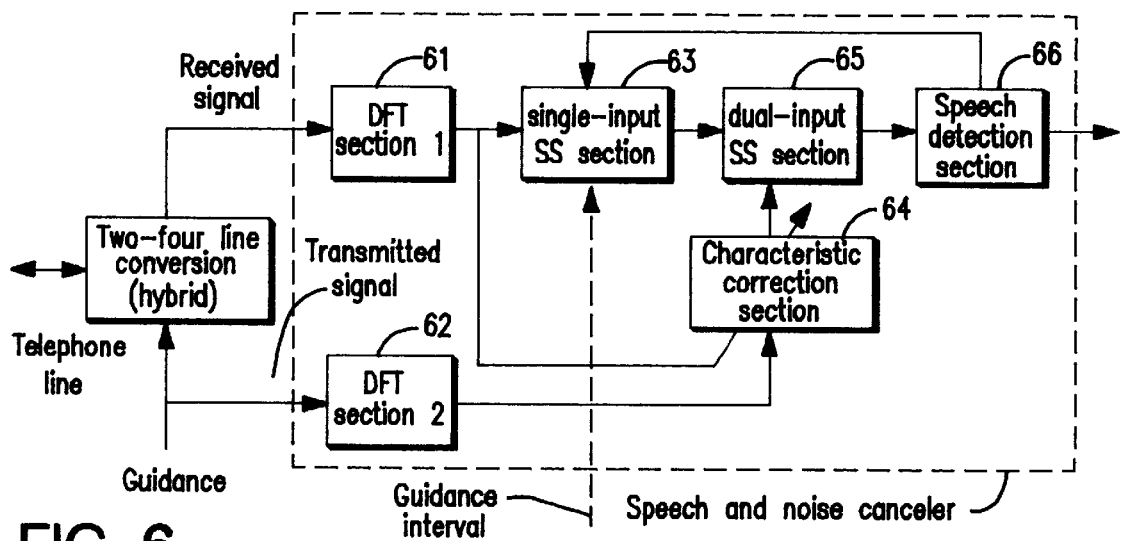
FIG. 6 is a block diagram showing an embodiment of a sixth speech and noise canceler according to the present invention.

FIG. 6 is a block diagram showing an embodiment of a sixth speech and noise canceler of the present invention. In this speech and noise canceler, in addition to the fourth speech and noise canceler, a single-input spectral subtraction section 63 finds noise to be canceled over an interval during which the speech detection section 66 is not detecting the speech interval and during which no transmitted telephone signal is present.

The single-input spectral subtraction section 63 estimates the spectrum of ambient noise by using an interval during which only the ambient noise around the caller is present and during which no automated voice is present. In addition to the effect attained by the fourth speech and noise canceler of FIG. 4, such configuration further decreases the possibility that accuracy for estimating the transmission characteristic H'(f) is deteriorated when using signals from a period during which the automated voice is not present, or when finding the average of signals including those from a period during which the automated voice is not present.

Figure 7:
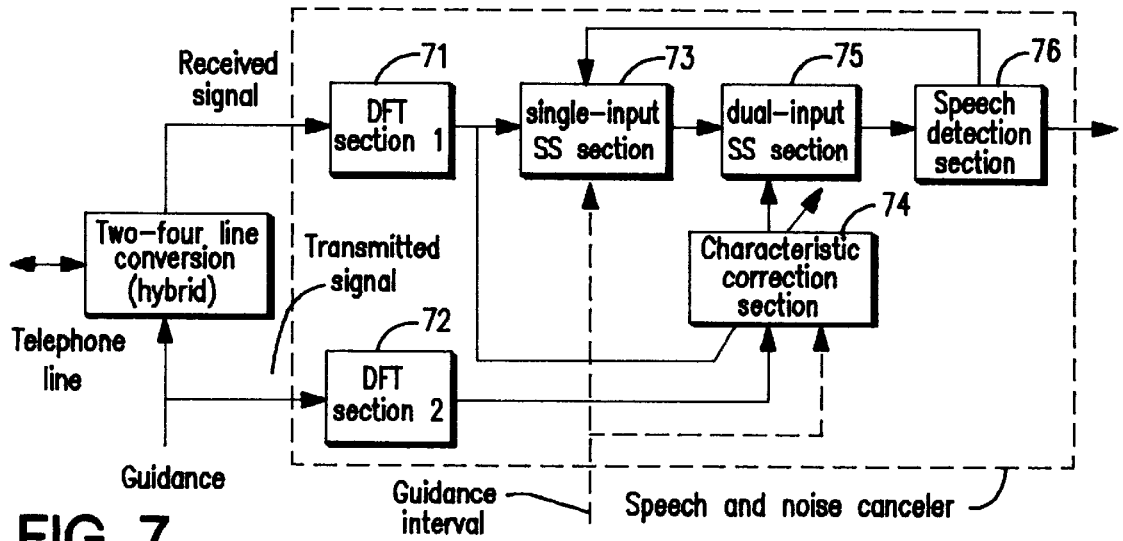
FIG. 7 is a block diagram showing an embodiment of a seventh speech and noise canceler according to the present invention.

FIG. 7 is a block diagram showing an embodiment of a seventh speech and noise canceler of the present invention. In this speech and noise canceler, in addition to the fourth, fifth or sixth speech and noise canceler, a characteristic correction section 74 estimates transmission characteristics on crossing-over of the transmitted signals to a receiver of the telephone over an interval during which transmitted telephone signals are present, and corrects the output signals of a second DFT section 72 for the characteristics of the receiver.

With such an arrangement, in addition to the effect the fourth, fifth or sixth speech and noise canceler has, there is provided the ability to enable it to estimate the characteristics by using only an interval during which the automated voice is surely present, thus obtaining high cancellation performance.

Figure 8:
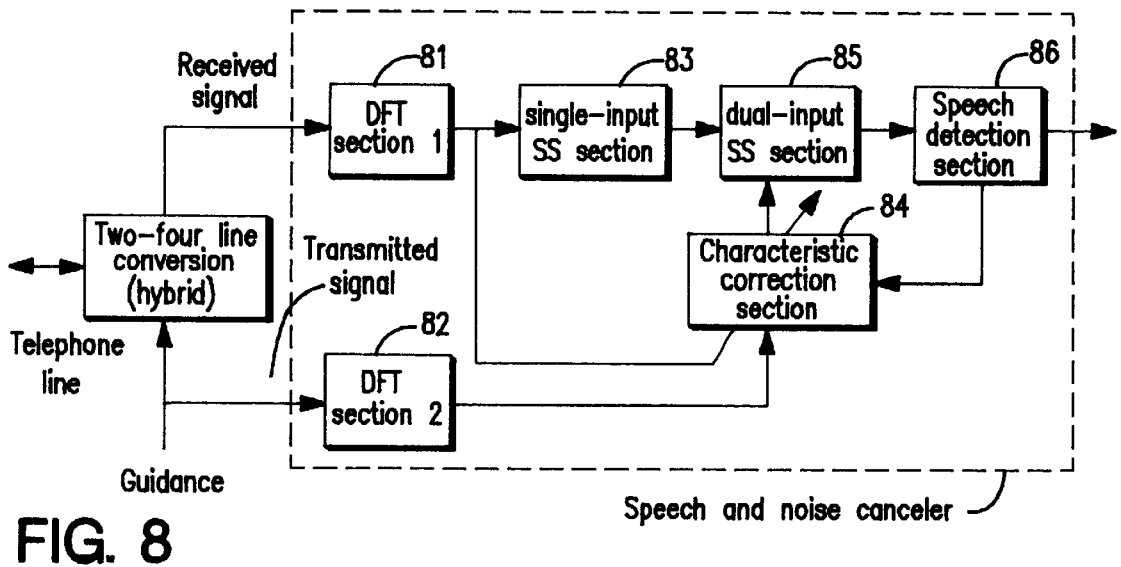
FIG. 8 is a block diagram showing an embodiment of an eighth speech and noise canceler according to the present invention.

FIG. 8 is a block diagram showing an embodiment of an eighth speech and noise canceler of the present invention. In this speech and noise canceler, in addition to the first or second speech and noise canceler of the present invention, a characteristic correction section 84 estimates transmission characteristics on crossing-over of the transmitted signals to a receiver of telephone over an interval during which the speech detection section 86 is not detecting a speech interval, and corrects the output signals of a second DFT section 82 for the characteristics of the receiver.

With such an arrangement, in addition to the effect the first or second speech and noise canceler has, there is provided the ability to prevent the accuracy of estimation from being deteriorated because the caller's voice mixes when the characteristic correction section 84 estimates the characteristics on crossing-over, enabling it to obtain high cancellation performance.

Figure 9:
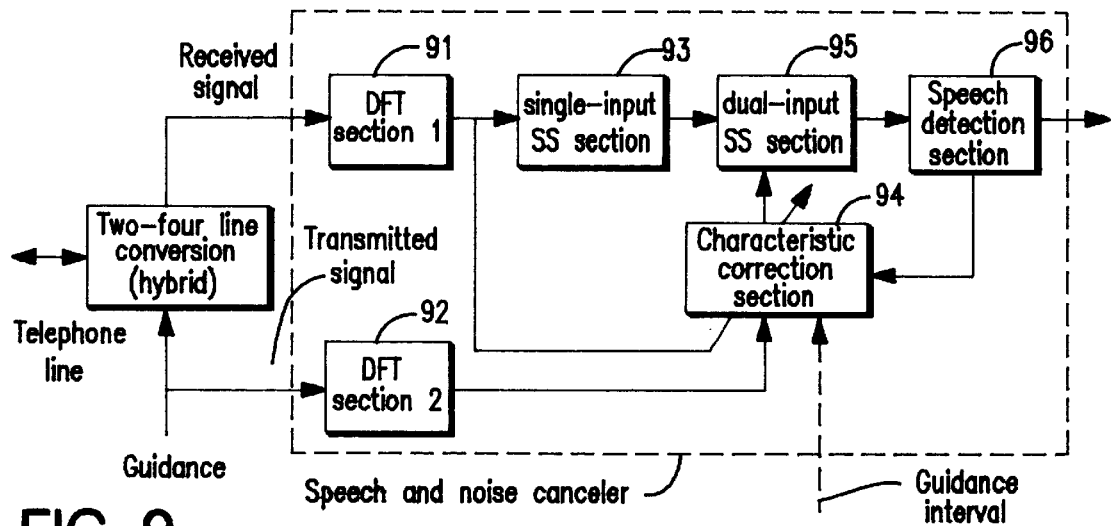
FIG. 9 is a block diagram showing an embodiment of a ninth speech and noise canceler according to the present invention.

FIG. 9 is a block diagram showing an embodiment of a ninth speech and noise canceler of the present invention. In addition to the third speech and noise canceler, this speech and noise canceler comprises a speech detection section 96 which detects an interval during which the caller is speaking by using the output of a dual-input spectral subtraction section 95, wherein a characteristic correction section 94 estimates transmission characteristics on crossing-over of the transmitted signals to a receiver of telephone over an interval during which the speech detection section 96 is not detecting a speech interval, and corrects the output signals of a second DFT section 92 for the characteristics of the receiver.

With such an arrangement, in addition to the effect the third speech and noise canceler of the present invention has, there is provided the ability to enable it to obtain high accuracy in estimation and thus high cancellation performance because the transmission characteristic on crossing-over is estimated in an interval during which the automated voice is surely present and the caller is not speaking. The speech detection section 96 may output only the spectrum finally found, and it may be possible to employ a configuration to output start and completion information of the detected speech, or to output only the spectrum from the start to completion of the detected speech.

Figure 10:
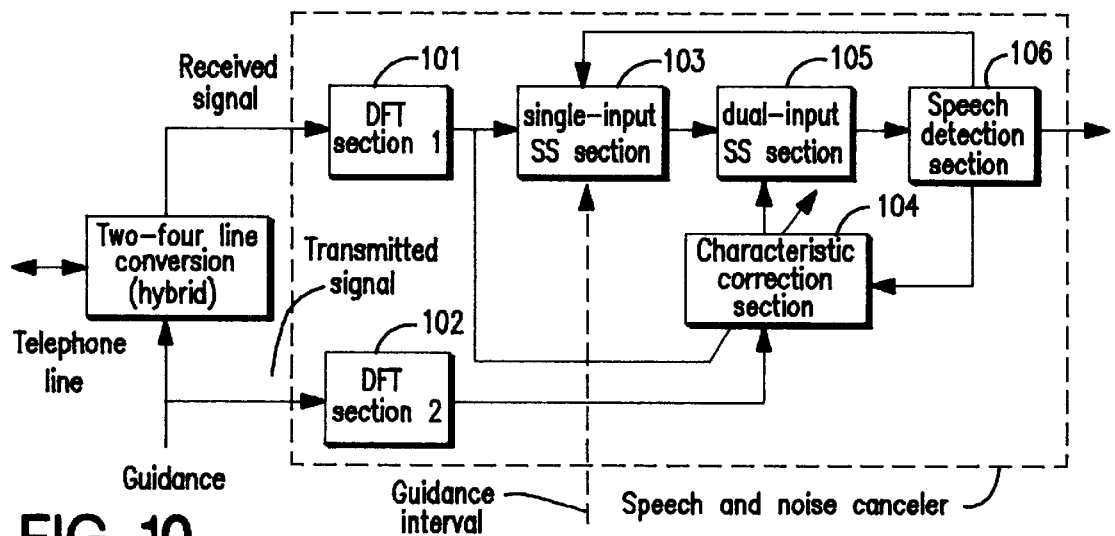
FIG. 10 is a block diagram showing an embodiment of a tenth speech and noise canceler according to the present invention.

FIG. 10 is a block diagram showing an embodiment of a tenth speech and noise canceler of the present invention. In this speech and noise canceler, in addition to the fourth, fifth or sixth speech and noise canceler of the present invention, a characteristic correction section 104 estimates transmission characteristics on crossing-over of the transmitted signals to a receiver of telephone over an interval during which the speech detection section 106 is not detecting a speech interval, and corrects the output signals of a second DFT section 102 for the characteristics of the receiver.

With such an arrangement, in addition to the effect the fourth, fifth or sixth speech and noise canceler has, there is provided the ability to prevent the accuracy of estimation from being deteriorated because the caller's voice mixes when the characteristic correction section 104 estimates the characteristics on crossing-over, and enabling it to obtain high cancellation performance.

Figure 11:
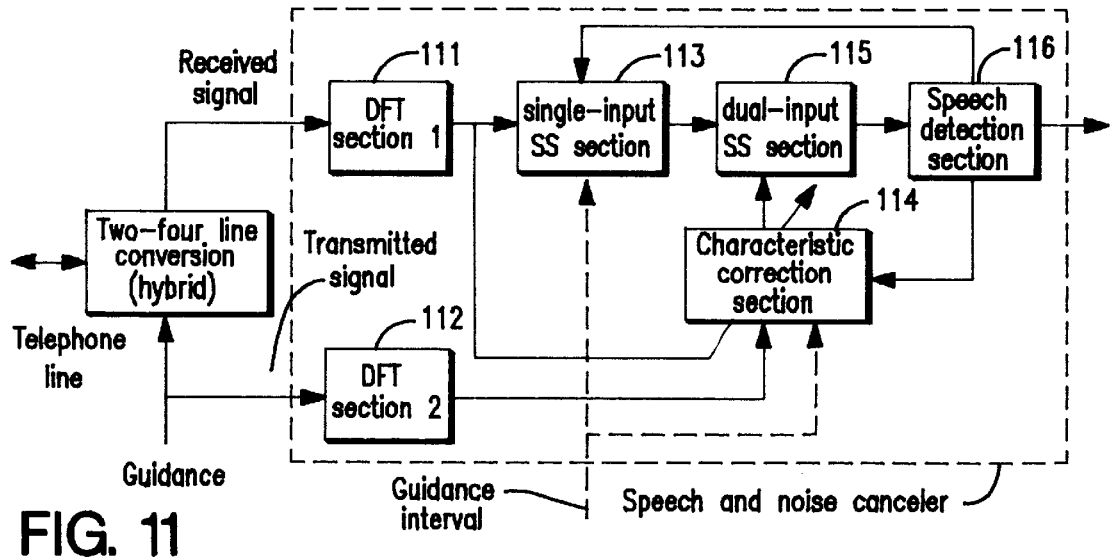
FIG. 11 is a block diagram showing an embodiment of an eleventh speech and noise canceler according to the present invention.

FIG. 11 is a block diagram showing an embodiment of an eleventh speech and noise canceler of the present invention. In this speech and noise canceler, in addition to the tenth speech and noise canceler, a characteristic correction section 114 estimates transmission characteristics on crossing-over of the transmitted signals to a receiver of the telephone over an interval during which the speech detection section 116 is not detecting a speech interval and during which transmitted telephone signals are present, and corrects the output signals of a second DFT section 112 for the characteristics of the receiver.

With such an arrangement, in addition to the effect the tenth speech and noise canceler has, there is provided the ability to enable it to estimate the characteristics by using only an interval during which the automated voice is surely present, thus obtaining high cancellation performance.

Figure 12:
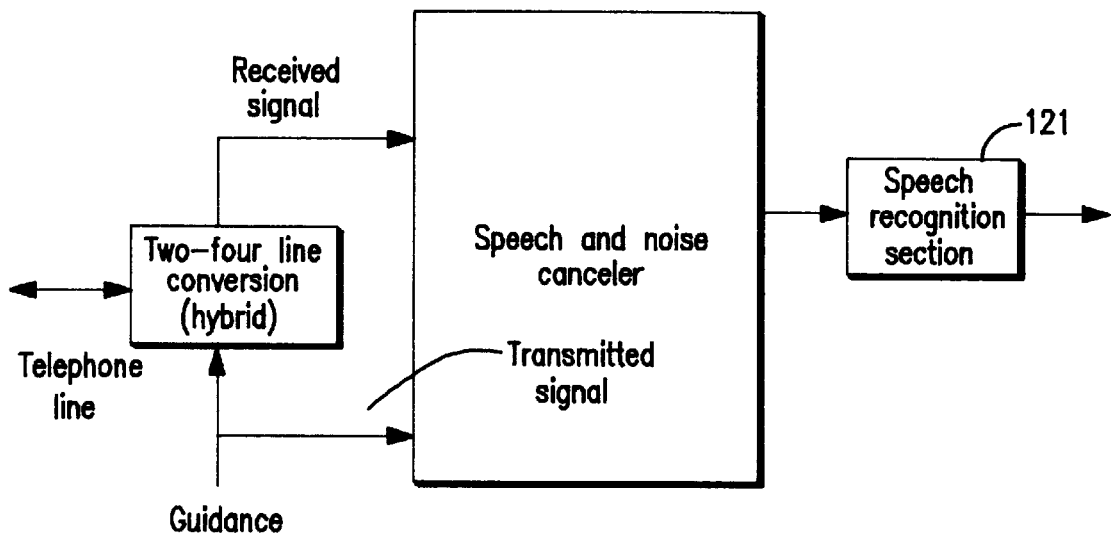
FIG. 12 is a block diagram showing an embodiment of a speech recognition device using a speech and noise canceler according to the present invention.
Figure 13:
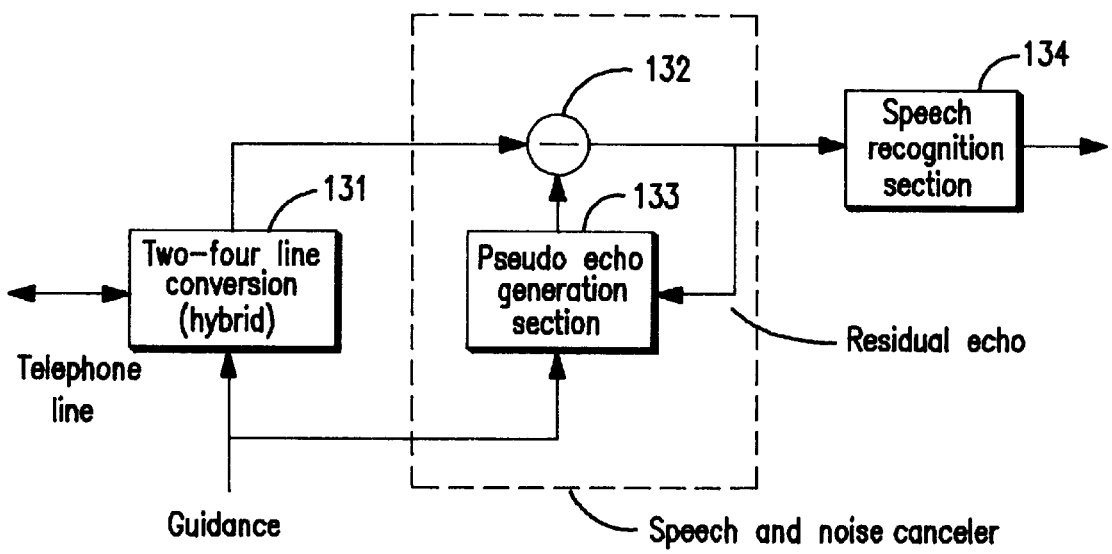
FIG. 13 is a block diagram showing an example of a conventional speech canceler.

FIG. 12 is a block diagram showing an embodiment of a speech recognition device using a speech and noise canceler of the present invention. It comprises a speech recognition section 121 which recognizes speech by using the output of the speech and noise canceler.

The recognition section 121 converts the spectrum output from the speech and noise canceler of the present invention into time sequence of feature vector for speech recognition, performs speech recognition and outputs the result of recognition. The recognition section 121 typically has speech detection means. The fourth and sixth through tenth speech and noise cancelers have the speech detection sections 46, 66, 76, 86, 96 and 106, respectively. In such case, it may be possible to employ a configuration utilizing the detection information of such section, or utilizing only the spectrum of speech interval extracted by the speech detection section 46, 66, 76, 86, 96 or 106. With such an arrangement, a high performance speech recognition device can be provided with the high capability of canceling noise and speech which the speech and noise canceler of the present invention has.

As clearly seen from the descriptions above, the speech and noise canceler of the present invention can provide a device with high accuracy which can also cancel ambient noise around the caller by previously canceling the ambient noise around the caller with single-input spectral subtraction.

The second advantage lies in that the automated voice can be canceled at a high accuracy because, even if the ambient noise around the caller is at a high level, the transmission characteristic on crossing-over can be properly estimated without being affected by such noise.

The third advantage lies in that a device with high accuracy can be provided because the transmission characteristic can be more accurately estimated by estimating the transmission characteristic on crossing-over using only the interval during which the automated voice is present.

The fourth advantage lies in that a device with high accuracy can be provided because the transmission characteristic can be more accurately estimated by providing a speech detection section, the output of which is utilized to estimate the transmission characteristics on crossing-over in an interval during which the caller is not speaking.

The fifth advantage lies in that ambient noise can be more accurately canceled by estimating the ambient noise for single-input spectral subtraction by using only an interval during which the automated voice is not present, and, thus, a device with high accuracy can be provided.

The sixth advantage lies in that a device with high accuracy can be provided because the transmission characteristic can be more accurately estimated by providing a speech detection section, the output of which is utilized to estimate the ambient noise for the single-input spectral subtraction in an interval during which the caller is not speaking, and, thus, a device with high accuracy can be provided.

The seventh advantage lies in that the speech recognition device utilizing the speech and noise canceler of the present invention can provide a high performance speech recognition device with its cancellation capability of high accuracy.

What is claimed is:

1. A speech and noise canceler, comprising:

a first subtraction section for determining ambient noise over an interval during which neither a caller nor an automated voice is speaking, and for subtracting said ambient noise from received signals;

a characteristic correction section for estimating transmission characteristics over an interval during which said automated voice is speaking and said ambient noise is not present, and for correcting transmitted signals by said transmission characteristics to coincide with said received signals; and a second subtraction section for removing said automated voice by subtracting the transmitted signals corrected by said characteristic correction section from the received signals from which said ambient noise has been subtracted by said first subtraction section.

2. A speech and noise canceler, comprising:

a first subtraction section for determining ambient noise over an interval during which neither a caller nor an automated voice is speaking, and for subtracting said ambient noise from received signals;

a characteristic correction section for estimating transmission characteristics over an interval during which said automated voice is speaking, and for correcting transmitted signals by said transmission characteristics to coincide with the received signals from which said ambient noise has been subtracted by said first subtraction section; and a second subtraction section for removing said automated voice by subtracting the transmitted signals corrected by said characteristic correction section from the received signals from which said ambient noise has been subtracted by said first subtraction section.

3. A speech and noise canceler, comprising:

a first DFT section for converting received signals to first spectra;

a second DFT section for converting transmitted signals to second spectra;

a first subtraction section for determining ambient noise over an interval during which neither a caller nor an automated voice is speaking, and for subtracting said ambient noise from said first spectra;

a characteristic correction section for estimating transmission characteristics over an interval during which said automated voice is speaking and said ambient noise is not present, and for correcting said second spectra by said transmission characteristics to coincide with said first spectra; and a second subtraction section for removing said automated voice by subtracting the second spectra corrected by said characteristic correction section from the first spectra from which said ambient noise has been subtracted by said first subtraction section.

4. A speech and noise canceler as claimed in claim 3, wherein:

said characteristic correction section detects an interval during which said automated voice is speaking by using signals indicating the presence of said automated voice.

5. A speech and noise canceler as claimed in claim 4, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

6. A speech and noise canceler as claimed in claim 3, further comprising:

a speech detection section for detecting an interval during which the caller is speaking by using the first spectra from which said automated voice has been removed by said second subtraction section;

wherein said first subtraction section detects an interval during which the caller is not speaking based on detection by said speech detection section.

7. A speech and noise canceler as claimed in claim 6, wherein:

said first subtraction section detects an interval during which said automated voice is not speaking by using signals indicating the presence of said automated voice.

8. A speech and noise canceler as claimed in claim 7, wherein:

said characteristic correction section detects an interval during which said automated voice is speaking by using signals indicating the presence of said automated voice.

9. A speech and noise canceler as claimed in claim 8, wherein:

said characteristic correction section detects an interval during which the caller is not speaking based on detection by said speech detection section.

10. A speech and noise canceler as claimed in claim 7, wherein:

said characteristic correction section detects an interval during which the caller is not speaking based on detection by said speech detection section.

11. A speech and noise canceler as claimed in claim 6, wherein:

said characteristic correction section detects an interval during which said automated voice is speaking by using signals indicating the presence of said automated voice.

12. A speech and noise canceler as claimed in claim 11, wherein:

said characteristic correction section detects an interval during which the caller is not speaking based on detection by said speech detection section.

13. A speech and noise canceler as claimed in claim 6, wherein:

said characteristic correction section detects an interval during which the caller is not speaking based on detection by said speech detection section.

14. A speech and noise canceler as claimed in claim 3, wherein:

said first subtraction section detects an interval during which said automated voice is not speaking by using signals indicating the presence of said automated voice.

15. A speech and noise canceler as claimed in claim 14, wherein:

said characteristic correction section detects an interval during which said automated voice is speaking by using signals indicating the presence of said automated voice.

16. A speech and noise canceler as claimed in claim 15, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

17. A speech and noise canceler as claimed in claim 14, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

18. A speech and noise canceler as claimed in claim 3, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

19. A speech and noise canceler, comprising:

a first DFT section for converting received signals to first spectra;

a second DFT section for converting transmitted signals to second spectra;

a first subtraction section for determining ambient noise over an interval during which neither a caller nor an automated voice is speaking, and for subtracting said ambient noise from said first spectra;

a characteristic correction section for estimating transmission characteristics over an interval during which said automated voice is speaking, and for correcting said second spectra by said transmission characteristics to coincide with the first spectra from which said ambient noise has been subtracted by said first subtraction section; and a second subtraction section for removing said automated voice by subtracting the second spectra corrected by said characteristic correction section from the first spectra from which said ambient noise has been subtracted by said first subtraction section.

20. A speech and noise canceler as claimed in claim 19, wherein:

said characteristic correction section detects an interval during which said automated voice is speaking by using signals indicating the presence of said automated voice.

21. A speech and noise canceler as claimed in claim 20, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

22. A speech and noise canceler as claimed in claim 19, further comprising:

a speech detection section for detecting an interval during which the caller is speaking by using the first spectra from which said automated voice has been removed by said second subtraction section;

wherein said first subtraction section detects an interval during which the caller is not speaking based on detection by said speech detection section.

23. A speech and noise canceler as claimed in claim 22, wherein:

said first subtraction section detects an interval during which said automated voice is not speaking by using signals indicating the presence of said automated voice.

24. A speech and noise canceler as claimed in claim 23, wherein:

said characteristic correction section detects an interval during which said automated voice is speaking by using signals indicating the presence of said automated voice.

25. A speech and noise canceler as claimed in claim 24, wherein:

said characteristic correction section detects an interval during which the caller is not speaking based on detection by said speech detection section.

26. A speech and noise canceler as claimed in claim 23, wherein:

said characteristic correction section detects an interval during which the caller is not speaking based on detection by said speech detection section.

27. A speech and noise canceler as claimed in claim 22, wherein:

said characteristic correction section detects an interval during which said automated voice is speaking by using signals indicating the presence of said automated voice.

28. A speech and noise canceler as claimed in claim 27, wherein:

said characteristic correction section detects an interval during which the caller is not speaking based on detection by said speech detection section.

29. A speech and noise cancelar as claimed in claim 22 wherein:

said characteristic correction section detects an interval during which the caller is not speaking based on detection by said speech detection section.

30. A speech and noise canceler as claimed in claim 19, wherein:

said first subtraction section detects an interval during which said automated voice is not speaking by using signals indicating the presence of said automated voice.

31. A speech and noise canceler as claimed in claim 30, wherein:

said characteristic correction section detects an interval during which said automated voice is speaking by using signals indicating the presence of said automated voice.

32. A speech and noise canceler as claimed in claim 31, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

33. A speech and noise canceler as claimed in claim 30, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

34. A speech and noise canceler as claimed in claim 19, further comprising:

a speech detection section for detecting an interval during which the caller is speaking by using the first spectra from which said automated voice has been removed by said second subtraction section;

wherein said characteristic correction section detects an interval during which the caller is not speaking based on detection by said speech detection section.

35. A speech recognition device, comprising:

a first subtraction section for determining ambient noise over an interval during which neither a caller nor an automated voice is speaking, and for subtracting said ambient noise from received signals;

a characteristic correction section for estimating transmission characteristics over an interval during which said automated voice is speaking and said ambient noise is not present, and for correcting transmitted signals by said transmission characteristics to coincide with said received signals;

a second subtraction section for removing said automated voice by subtracting the transmitted signals corrected by said characteristic correction section from the received signals from which said ambient noise has been subtracted by said first subtraction section; and a speech recognition section for recognizing speech by using the received signals from which said automated voice has been removed by said second subtraction section.

36. A speech recognition device, comprising:

a first DFT section for converting received signals to first spectra;

a second DFT section for converting transmitted signals to second spectra;

a first subtraction section for determining ambient noise over an interval during which neither a caller nor an automated voice is speaking, and for subtracting said ambient noise from said first spectra;

a characteristic correction section for estimating transmission characteristics over an interval during which said automated voice is speaking and said ambient noise is not present, and for correcting said second spectra by said transmission characteristics to coincide with said first spectra;

a second subtraction section for removing said automated voice by subtracting the second spectra corrected by said characteristic correction section from the first spectra from which said ambient noise has been subtracted by said first subtraction section; and a speech recognition section for recognizing speech by using the first spectra from which said automated voice has been removed by said second subtraction section.

37. A speech and noise canceler, comprising:

a first subtraction section for determining ambient noise over an interval during which neither a caller nor an automated voice is speaking, and for subtracting said ambient noise from received signals;

a characteristic correction section for estimating transmission characteristics over an interval during which said automated voice is speaking, and for correcting transmitted signals by said transmission characteristics to coincide with the subtracted signals from which said ambient noise has been subtracted by said first subtraction section;

a second subtraction section for removing said automated voice by subtracting the transmitted signals corrected by said characteristic correction section from the received signals from which said ambient noise has been subtracted by said first subtraction section; and a speech recognition section for recognizing speech by using the received signals from which said automated voice has been removed by said second subtraction section.

38. A speech and noise canceler, comprising:

a first DFT section for converting received signals to first spectra;

a second DFT section for converting transmitted signals to second spectra;

a first subtraction section for determining ambient noise over an interval during which neither a caller nor an automated voice is speaking, and for subtracting said ambient noise from said first spectra;

a characteristic correction section for estimating transmission characteristics over an interval during which said automated voice is speaking, and for correcting said second spectra by said transmission characteristics to coincide with the first spectra from which said ambient noise has been subtracted by said first subtraction section;

a second subtraction section for removing said automated voice by subtracting the second spectra corrected by said characteristic correction section from the first spectra from which said ambient noise has been subtracted by said first subtraction section; and a speech recognition section for recognizing speech by using the first spectra from which said automated voice has been removed by said second subtraction section.

* * * * *